United States Patent [19]

Okamoto

[11] Patent Number: 5,512,927
[45] Date of Patent: Apr. 30, 1996

[54] IMAGE FORMING APPARATUS HAVING A PHOTOSENSITIVE DRUM ROTATABLE AT DIFFERENT SPEEDS

[75] Inventor: Toyoo Okamoto, Machida, Japan

[73] Assignee: Ricoh Co., Ltd., Tokyo, Japan

[21] Appl. No.: 79,132

[22] Filed: Jun. 18, 1993

[30] Foreign Application Priority Data

Jun. 30, 1992 [JP] Japan .................................. 4-197612

[51] Int. Cl.⁶ .................................................. G01D 15/14
[52] U.S. Cl. ........................... 347/129; 347/139; 347/248
[58] Field of Search ............................. 347/16, 248, 262, 347/129, 139; 355/243; 358/464, 486

[56] References Cited

U.S. PATENT DOCUMENTS

| | | | |
|---|---|---|---|
| 4,578,689 | 3/1986 | Spencer et al. | 346/160 |
| 5,040,075 | 8/1991 | Takayamagi | 358/300 |
| 5,051,780 | 9/1991 | Stelter et al. | 355/208 |
| 5,095,370 | 3/1992 | Takada et al. | 358/300 |
| 5,247,332 | 9/1993 | Taniguchi et al. | 355/204 |
| 5,442,382 | 8/1995 | Pfeuffer | 346/136 |
| 5,457,483 | 10/1995 | Oikawa | 347/129 |

Primary Examiner—Peter S. Wong
Assistant Examiner—Randy W. Gibson
Attorney, Agent, or Firm—Cooper & Dunham

[57] ABSTRACT

An image forming apparatus which forms on a recording paper a visible image in accordance with image data, the forming being performed by using an electrophotographic method, and the apparatus being able to reduce a total recording time spent for recording one page as compared to the present technology. The image forming apparatus comprises a processing unit, comprising a photosensitive drum on which a latent image is formed while the drum is being rotated at a predetermined rotational speed, for processing the image data so as to form the visible image, a conveying unit for conveying the recording paper to/from the processing unit, a driving unit for driving the photosensitive drum and the conveying unit, and a controlling unit for controlling the driving unit so that the rotational speed of the photosensitive drum is changed based on a length of the visible image being formed on said recording paper. A processing time spent on a blank part of the recording paper being reduced by effecting an increase in the rotational speed of the photosensitive drum.

6 Claims, 4 Drawing Sheets

IMAGE FORMING APPARATUS HAVING A PHOTOSENSITIVE DRUM ROTATABLE AT DIFFERENT SPEEDS

BACKGROUND OF THE INVENTION

The present invention generally relates to an image forming apparatus using an electrophotographic method, and more particularly to an image forming apparatus in which an image forming onto a photosensitive medium is performed by means of laser beam, and in which a stepping motor is used for driving a photosensitive medium and conveying rollers.

As an image forming apparatus using an electrophotographic method, a laser printer, a digital copying machine and a facsimile machine are known. A laser printer, for example, performs a formation of an image onto a photosensitive medium by radiating a laser beam onto the photosensitive medium, the laser beam being controlled based on image data supplied by a host computer. The photosensitive medium is normally formed in a drum shape, and is rotationally driven by a motor. Scanning along a direction perpendicular to a rotational direction (primary scanning direction) of the photosensitive drum in an image forming operation is normally performed by deflecting a laser beam which is reflected by a polygon mirror rotating at high speed. A secondary scanning is performed by means of a rotation of the photosensitive drum. In the secondary scanning a position of a laser beam spot on the photosensitive drum is moved along the rotational direction of the photosensitive drum.

In the above-mentioned image forming apparatus, in order to obtain a high line-density of an image formed on the photosensitive drum, a high accuracy of driving of the photosensitive drum is required. Thus, use of stepping motors has increased. The reason for using a stepping motor is that a rotational speed and an angular position of a rotational shaft of a stepping motor can be controlled by an open loop control without a position detector or a feedback circuit. This means that using a stepping motor brings an advantage that a highly accurate control of rotation of the photosensitive drum can be performed using a simple construction. Additionally, a stepping motor has a quick response due to having a pulse drive. Further, the cost of stepping motors has been reduced.

A recording paper fed to a photosensitive drum is conveyed at the same speed as a circumference speed of the photosensitive drum because an image formed by toner on the photosensitive drum is transferred to the recording paper. Accordingly, when a stepping motor is used for driving a photosensitive drum, a stepping motor is also used for driving a conveying mechanism for recording papers.

In a conventional image forming apparatus, since a process speed during an image forming operation is set to be constant, a time needed for forming an image of one page depends on a size of a recording paper being used. For example, a time needed for recording on sheets of the same size is constant regardless of whether an image is formed only in a short length part of an entire recording paper or on a long part thereof. In other words, an excessive time is spent in forming an image for one page in a case where the image is not formed over the entire recording paper lengthwise. Therefore, there is a problem in that a constant conveying speed of a recording paper prevents a reduction of an overall image forming process time.

Further, in a conventional image forming apparatus, alteration of a recording density in the primary scanning direction is performed without changing a scanning speed in the secondary scanning direction, that is, the alteration is performed by changing a rotational speed of a polygon mirror. When increasing recording density, for example, an increase of recording density in the secondary scanning direction can be performed by increasing a rotational speed of the polygon mirror, and an increase of recording density in the primary scanning direction can be performed by increasing a number of switching of the laser beam. The switching of the laser beam is performed by shortening a cycle of clock pulse supplied to the laser generator. Additionally, if the rotational speed of the polygon mirror is increased, energy of the laser beam per unit area irradiated onto the photosensitive drum is reduced, and thus the intensity of the laser beam must be increased. Accordingly, the cycle of a clock used for controlling an irradiation of a laser beam and an output intensity of the laser beam must be changed due to the change in polygon mirror rotating speed; thus there is a problem in that a control of the image forming operation becomes complex.

SUMMARY OF THE INVENTION

It is a general object of the present invention to provide an improved and useful image forming apparatus in which the above-mentioned disadvantages are eliminated.

A more specific object of the present invention is to provide an image forming apparatus which can reduce a recording time based on an amount of image to be recorded in one page.

In order to achieve the above-mentioned object, an image forming apparatus according to the present invention, which image forming apparatus forms a visible image on a recording paper in accordance with image data by using an electrophotographic method, comprises:

a processing unit, comprising a photosensitive drum on which a latent image is formed while the drum is being rotated at a predetermined rotational speed, for processing the image data so as to form the visible image;

a conveying unit for conveying the recording paper to/from the processing unit;

a driving unit for driving the photosensitive drum and the conveying unit; and a controlling unit for controlling the driving unit so that the rotational speed of the photosensitive drum is changed based on a length of the visible image to be formed on said recording paper.

According to the present invention, rotational speed of the photosensitive drum can be increased. Thus a processing time spent on formation of a blank part of the recording paper can be reduced by increasing the rotational speed of the photosensitive drum.

Other objects, features and advantages of the present invention will become more apparent from the following detailed description when read in conjunction with the accompanying drawings.

DETAILED DESCRIPTION OF THE PREFERRED EMBODIMENT

Figure 1:
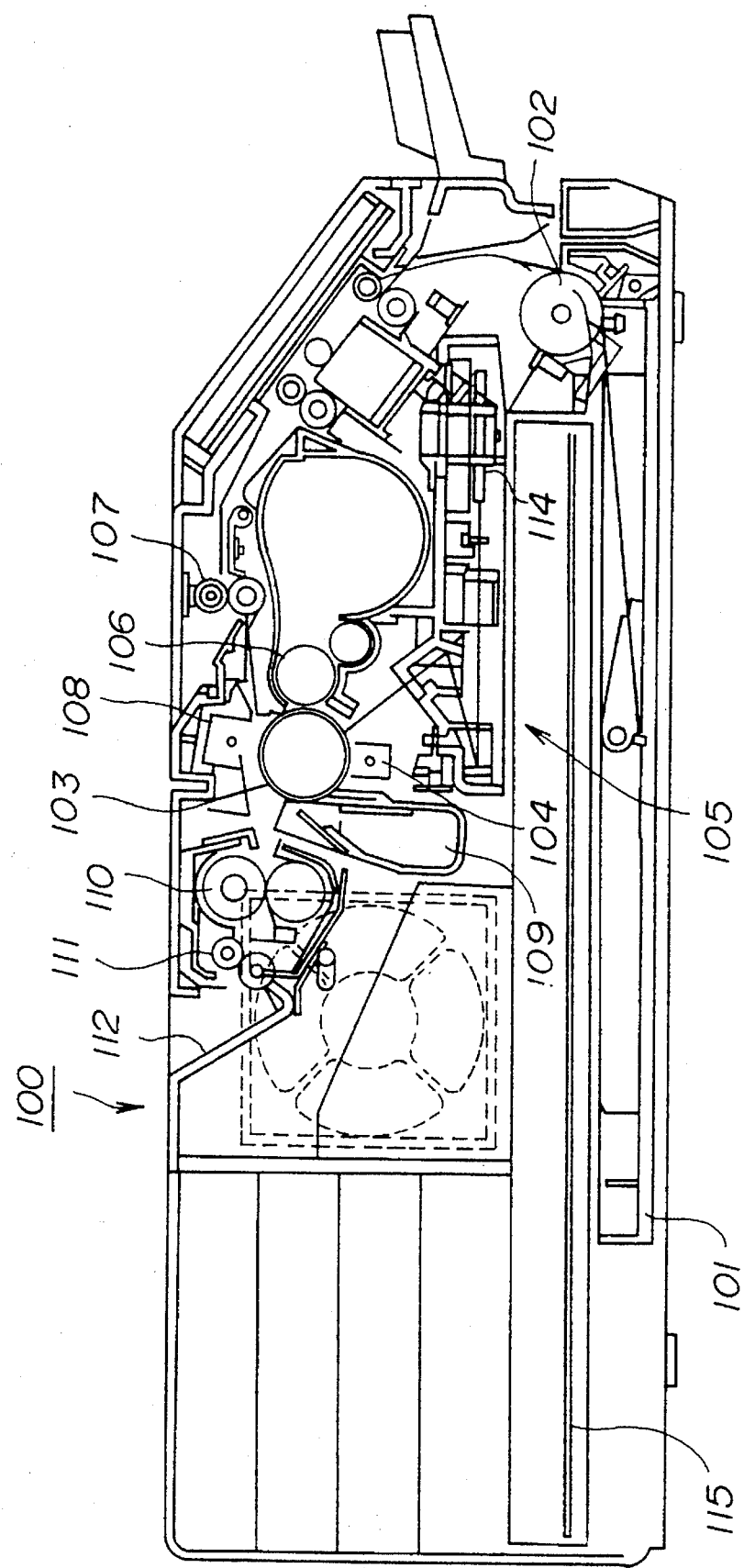
FIG. 1 is a schematic illustration of a laser printer according to an embodiment of the present invention.

A description will be given, with reference to FIG. 1, of an embodiment according to the present invention. FIG. 1 is a schematic illustration of a laser printer 100 according to the embodiment.

Recording papers are set in a paper supply cassette 101. A paper feed roller 102 takes out recording papers one by one to convey the recording papers further inside the laser printer 100.

In the laser printer 100, there is provided a photosensitive drum 103 onto which an electrostatic latent image is formed. An electrostatic charger 104 charges a surface of the photosensitive drum 103 by means of corona discharge.

An optical unit 105 is provided for forming a latent image onto the photosensitive drum 103 by using a laser beam. A developing unit 106 develops the latent image formed on the photosensitive drum 103.

A recording paper fed from the paper supply cassette 101 is fed to the photosensitive drum by a registration roller 107 at a predetermined timing. Then a toner image formed by development performed by the developing unit 106 is transferred, by a transfer charger 108, onto the recording paper fed by the registration roller 107.

A cleaning unit 109 cleans a toner remaining on the surface of the photosensitive drum 103 after the completion of the transferring operation.

A fixing unit 110 fixes the toner image which was transferred onto the recording paper. Then the recording paper is ejected to outside the laser printer 100, and is kept in a tray 102.

Additionally, a printed circuit board 115, on which electronic parts for controlling operations performed in the laser printer 100 are mounted, is provided in the bottom part of the laser printer 100.

It should be noted that a polygon mirror 114 (to be described later) is provided in the optical unit 105.

A description will be now given of an image forming operation of the laser printer 100. When the image forming operation starts, the entire surface of the photosensitive drum 103 is uniformly charged by the electrostatic charger 104. Then a laser beam is irradiated from the optical unit 105 onto the surface of the photosensitive drum 103 so as to perform an exposure process.

In the optical unit 105, there is provided a laser generator (not shown in the figure), and a laser beam radiated by the laser generator is reflected by the polygon mirror rotating at a high speed. The reflected laser beam is incident upon the surface of the photosensitive drum 103 so that the exposure process is performed. By the deflection of the laser beam performed by means of the reflection by the polygon mirror 114, a scanning in a primary scanning direction is performed. A scanning in a secondary scanning direction is performed by means of a rotation of the photosensitive drum 103 by which the exposed spot on the photosensitive drum 103 is moved.

By performing the above-mentioned exposure process, an electrostatic latent image corresponding to image data is formed on the surface of the photosensitive drum 103. As the photosensitive drum 103 rotates, the latent image on the surface of the photosensitive drum 103 reaches the developing unit 106 and the latent image is turned into a visible image which is a toner image. Then the toner image is transferred, by the transfer charger 108, onto the recording paper fed by the registration roller 107.

The recording paper onto which the toner image was transferred is conveyed to the fixing unit 110, and the toner image is fixed on the recording paper by the fixing unit 110. After the toner image is fixed, the recording paper is ejected, by the eject roller 11, to outside the laser printer 100.

Figure 2:
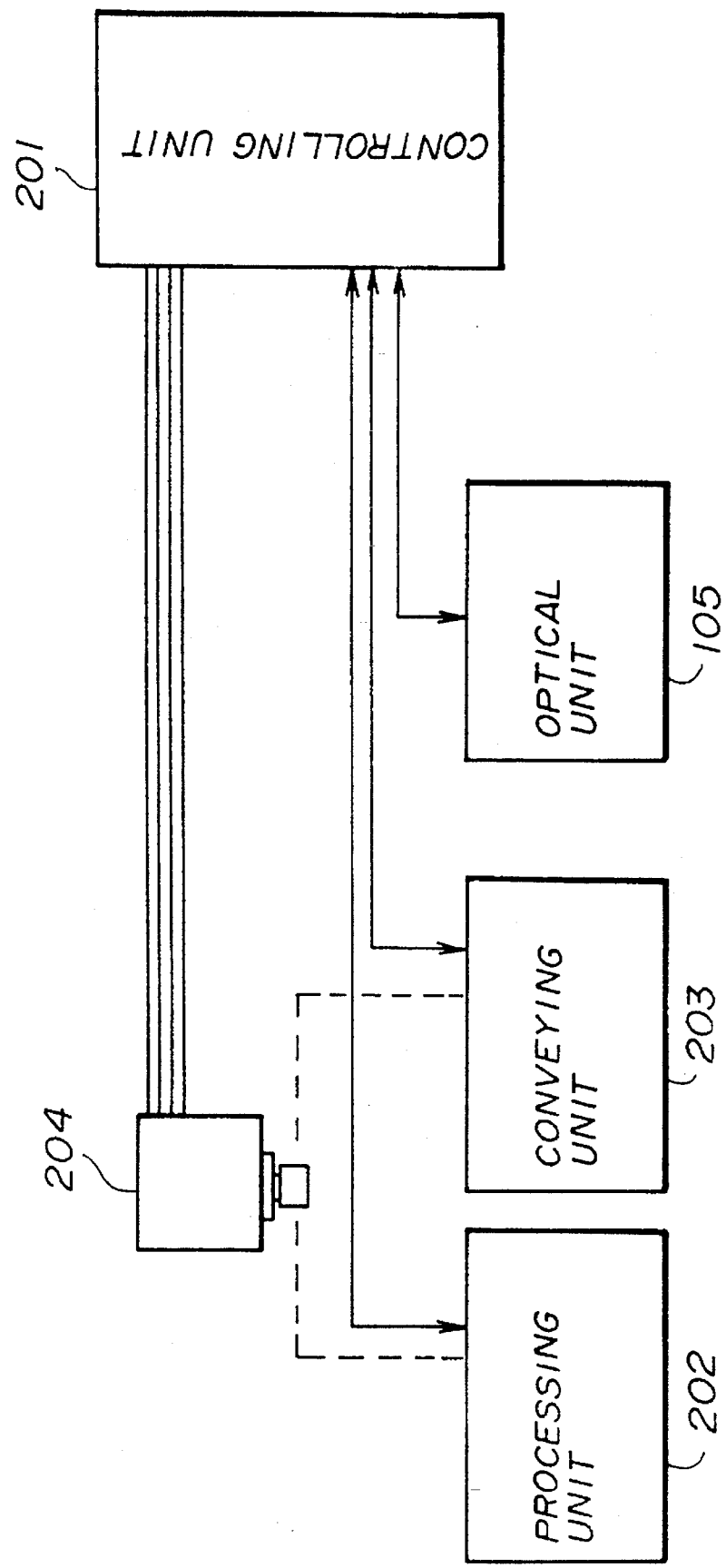
FIG. 2 is a block diagram of the laser printer shown in FIG. 1.

FIG. 2 is a block diagram of the laser printer 100 for explaining a control performed in the laser printer 100. As shown in the figure, the laser printer 100 comprises a controlling unit 201, a processing unit 202, a conveying unit 203, and the optical unit 105. The controlling unit 201, comprising the printed circuit board 115 shown in FIG. 1, controls the entire operation of the laser printer 100. The processing unit 202 includes the photosensitive drum 103, the electrostatic charger 104, the developing unit 106, and the fixing unit 108. The conveying unit 203 includes a conveying mechanism for the recording paper such as the paper feed roller 102, the registration roller 107, and the eject roller 111.

Additionally, the laser printer 100 is provided with a stepping motor 204 which is driven by an electric pulse supplied by the controlling unit 201. The stepping motor 204 drives the photosensitive drum 103 and a developing roller in the developing unit 106 in the processing unit 202, and the paper feed roller 102 and the registration roller 107 included in the conveying unit 203.

The controlling unit 201 temporarily stores image data when the image data is received from, for example, a host computer connected to the laser printer 100. The image data includes information for various setting conditions such as a recording density and a recording paper size. The controlling unit 201 performs a setting operation in accordance with the information for setting conditions, and controls the image forming operation by controlling the processing unit 202, the conveying unit 203, the optical unit 105, and the stepping motor 204 so that a picture corresponding to the image data is formed on the recording paper.

Figure 3:
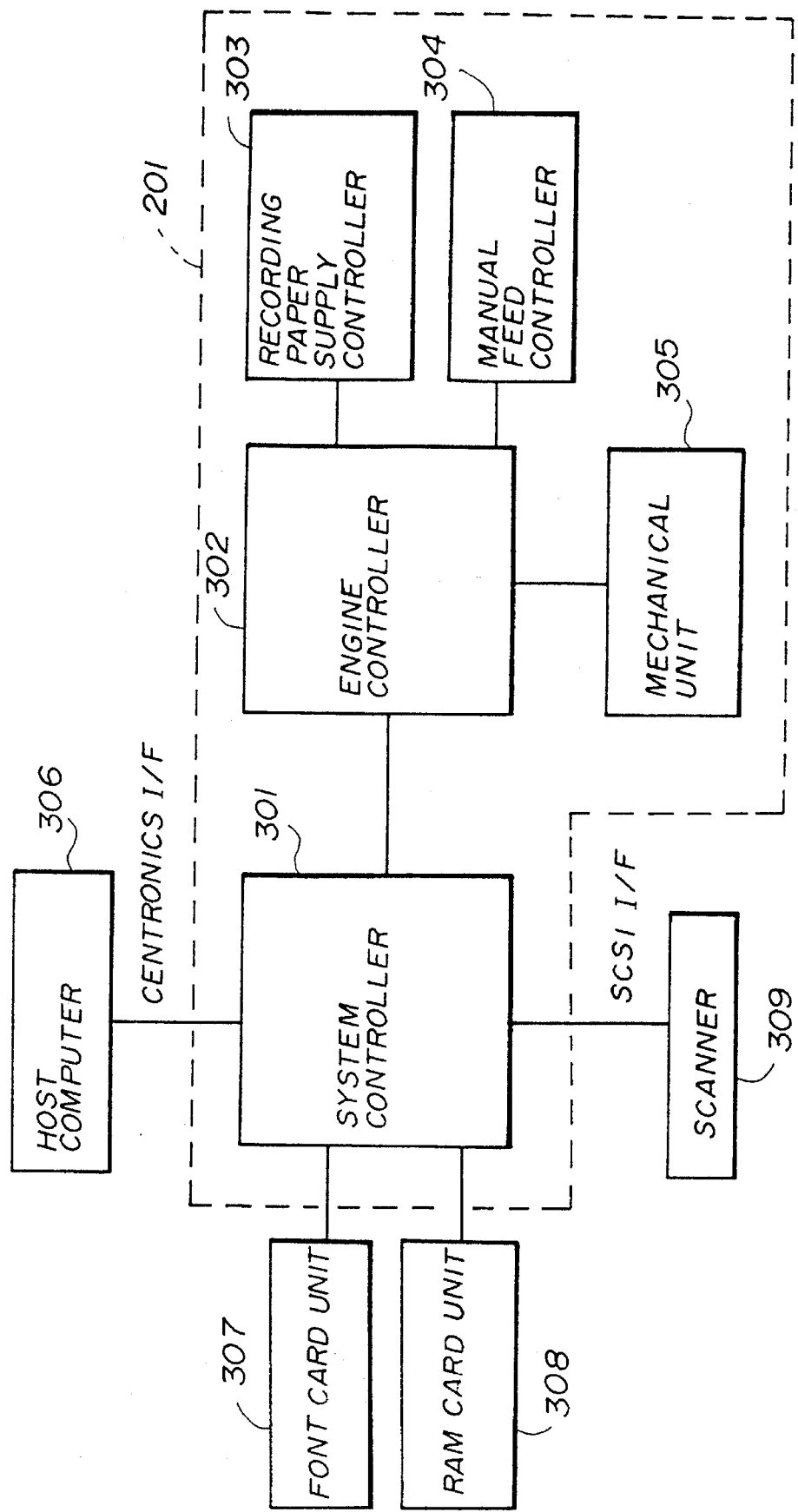
FIG. 3 is a block diagram of a controlling unit shown in FIG. 2.

FIG. 3 is a block diagram of the controlling unit 201. A system controller 301 performs the above-mentioned controlling operation and controls the entire system of the laser printer 100. An engine controller 302 is controlled by the system controller 301 and performs various controlling operations for a mechanical unit 305. The controlling operations performed by the engine controller include an operation such as video control, polygon clock control, stepping motor control, and laser clock control. The controlling unit 201 further includes a recording-paper supply controller 303 and a manual feed controller 304 used when a recording paper is manually fed, one by one, to the laser printer 100. The system controller 301 is connected to a host computer 306 via the centronics interface so that various instructions for operation and image data to be processed are supplied from the host computer 306. A font card unit 307 and a RAM card unit 308 may be connected to the system controller 301 to supply various data to the system controller 301. The system controller unit may be also connected to a scanner via the SCSI interface.

Figure 4:
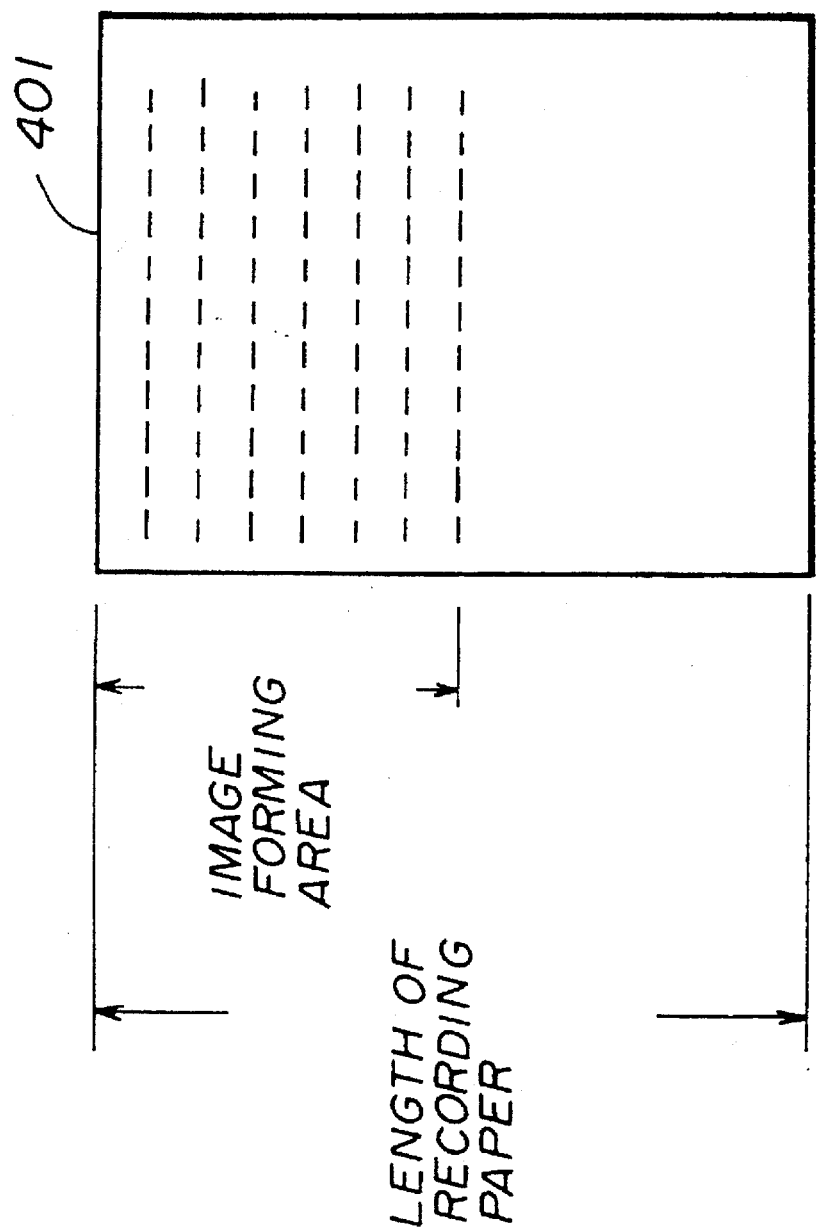
FIG. 4 is an example of a recording paper on which an image was formed.

A description will now be given of a control of processing speed in the image forming operation performed by the laser printer 100. FIG. 4 is a view of an example of a recording paper on which an image was formed.

As shown in FIG. 4, an image was formed only in a part of a face of a recording paper 401 as is sometimes the case in actual use. In such a case where an image is to be formed in the upper part of the recording paper 401, a recording time spent on the recording paper 401 can be reduced by making a conveying speed for a blank part of the recording paper 401 faster than a conveying speed for the upper part on which the image is to be formed. That is, an image forming process time for one recording paper can be reduced by increasing a secondary scanning speed in a blank part of the recording paper without there being any influences to the image formed on the recording paper 401. It should be noted that completion of the image forming operation performed onto the photosensitive drum 103 for the upper part is recognized by the controlling unit 201.

As is described in the above, image data which the laser printer 100 receives includes various setting conditions for an image forming operation, such as a recording density and a recording paper size. It should be noted that the image data supplied to the laser printer is normally code data which is obtained by, for example, input data from a key board inputting apparatus such as a word processor. The controlling unit 201 converts image data, which is generally code data, into pixel data in accordance with the various setting conditions, and stores the actual image data in a memory. By using the pixel data and information for the various setting conditions, the controlling unit 201 can easily recognize a position of an image forming area on the photosensitive drum 103 and an image forming area on the recording paper 401.

A rotational speed and an angular position of an output shaft of the stepping motor 204 are accurately controllable, and the rotational speed thereof can be easily changed by varying a cycle of electric pulse supplied to the stepping motor 204. According to these performance characteristics of the stepping motor 204, a speed in the secondary scanning direction (rotational speed of the photosensitive drum 103) can be increased immediately after the transferring operation of the toner image onto the recording paper 103 is completed; thus an image forming process time is reduced in accordance to the area of the image to be recorded. The reduction effect on image forming process time is more effective as a length of the recording paper 401 is longer or as a length of the image forming area is shorter relative to the length of the recording paper 401.

There may be a case where the image forming area on the recording paper 401 is separated, for example, into two parts, one on the upper side and the other on the lower side. Accordingly, a blank part is formed between the upper part and the lower part. In such a case, the image forming process time can be reduced by increasing the rotational speed of the photosensitive drum 103 from the time when the transferring operation of the toner image corresponding to the upper side is completed and till the time when the latent image forming operation corresponding to the lower side starts. Hereupon, if an output of the electrostatic charger is to be constant while the rotational speed of the photosensitive drum 103 is increased, charge potential on the surface of the photosensitive drum 103 is relatively reduced, resulting in a decrease in charge potential of the photosensitive drum 103. In order to eliminate this disadvantage, the increased rotational speed of the photosensitive drum 103 should be reduced to the normal speed thereof before a part of the photosensitive drum 103, on which part a latent image is to be formed corresponding to the lower side, reaches the electrostatic charger 104. Accordingly, change of the rotational speed of the photosensitive drum 103 should be performed in accordance to a length of the blank part between the upper and the lower image forming areas and in accordance to the length of the recording paper 401.

A description will now be given of a control for altering a rotational speed of the photosensitive drum 103. A recording density includes a pixel density which corresponds to the primary scanning direction and a line density which corresponds to the secondary scanning direction. On the assumption that the rotational speed of the photosensitive drum 103 is maintained so as to be constant, as in a conventional method, changing of a line density must be performed by changing the rotational speed of the polygon mirror 114; thus it is also required to vary a cycle of a clock used by the laser generator and the output intensity of the laser beam. On the other hand, when the line density is changed by altering the rotational speed of the photosensitive drum 103, neither the change of the rotational speed of the polygon mirror 114 nor the change of the cycle of the clock is required; thus the controlling operation for altering a line density is simplified.

It should be noted that since the photosensitive drum 103 is driven by a stepping motor 204, the rotational speed of the photosensitive drum 103 may be altered to a plurality of speeds with a high accuracy. This means that an image forming operation with changes in recording density page by page can be simply performed.

Additionally, when performing an image forming operation by using image data which is mixed with code data and pixel data obtained by scanner, the recording density can be changed in response to the code data or the pixel data. In this case, if a pixel size of the pixel data, which pixel size is determined by the scanning speed of the original picture, is larger than that of the code data, an image forming process time is reduced.

Further, when the image forming operation for the image forming area is completed, an electric supply to the electrostatic charger 104 and the fixing unit 108 may be cut-off so as to reduce an electricity amount spent by the laser printer thus reducing an associated cost of electricity.

It should be noted that when the rotational speed of the photosensitive drum 103 is increased, the recording paper passes through the fixing unit 108, which may affect the fixing of the toner image. However, since a fixing temperature is normally set to a temperature sufficient to fix an all black image, which is a temperature sufficiently higher than that required for a normal image, an influence of increased rotational speed of the photosensitive drum 103 on the fixing is negligible.

The present invention is not limited to the specifically disclosed embodiment, and variations and modifications may be made without departing from the scope of the present invention.

What is claimed is:

1. An image forming apparatus which forms on a recording paper a visible image in accordance with image data, the forming being effected by using an electrophotographic method comprising:

processing means, comprising a photosensitive drum on which a latent image is formed while the drum is being rotated at a predetermined rotational speed, for processing said image data so as to form said visible image;

conveying means for conveying said recording paper to/from said processing means;

driving means for driving said photosensitive drum and said conveying means; and controlling means for controlling said driving means so that said rotational speed of said photosensitive drum is changed based on a length of said visible image to be formed on said recording paper;

wherein said driving means comprises a stepping motor, and said controlling means changes said rotational speed of said photosensitive drum by changing a cycle of an electric pulse supplied to said stepping motor; and wherein said photosensitive drum is rotated at a first rotational speed when said latent image is being formed thereon or at a second rotational speed faster than said first rotational speed, and wherein said controlling means changes said rotational speed of said photosensitive drum from said first rotational speed to said second rotational speed when a formation of said latent image corresponding to one page of said recording paper is complete.

2. The image forming apparatus as claimed in claim 1, wherein said photosensitive drum is rotated at a first rotational speed when said latent image is being formed thereon or at a second rotational speed faster than said first rotational speed, said controlling means further comprises determining means for determining a position of a blank area, that is an area in which no visible image is to be formed, to be formed on said recording paper, and said controlling means controls said driving means so that said photosensitive drum is driven at said first rotational speed when said latent image is being formed thereon and said photosensitive drum is driven at said second rotational speed when the area with no latent image is being formed on said photosensitive drum so as to form said blank area on said recording paper.

3. The image forming apparatus as claimed in claim 2, wherein said processing means further comprises an electrostatic charger provided for charging said photosensitive drum with a static electric charge before a formation of said latent image is performed, and said driving means drives said photosensitive drum so that said rotational speed of said photosensitive drum is changed from said first rotational speed to said second rotational speed when a portion of said photosensitive drum corresponding to a position where a next latent image is to be formed reaches a position where a charging operation for the next latent image is to be performed by said charging means.

4. The image processing apparatus as claimed in claim 1, wherein said controlling means further comprises recording density changing means for changing a recording density of said visible image by changing said rotational speed of said photosensitive drum based on said image data.

5. The image forming apparatus as claimed in claim 4, wherein said driving means comprises a stepping motor, and said recording density changing means changes said rotational speed of said photosensitive drum by changing a cycle of an electric pulse supplied to said stepping motor.

6. The image forming apparatus as claimed in claim 1, wherein said processing means further comprises an electrostatic charger provided for charging said photosensitive drum with a static electric charge before a formation of said latent image is performed, and a fixing unit provided for fixing a toner image formed on said photosensitive drum, and wherein said controlling unit effects controls so as to stop an electric supply to said electrostatic charger and said fixing unit when said toner image corresponding to said image forming area has passed through said fixing unit.

\* \* \* \* \*

UNITED STATES PATENT AND TRADEMARK OFFICE
CERTIFICATE OF CORRECTION

PATENT NO. : 5,512,927
DATED     : April 30, 1996
INVENTOR(S) : Toyoo Okamoto

It is certified that error appears in the above-indentified patent and that said Letters Patent is hereby corrected as shown below:

Title page, item [75], delete "Machida" and insert --Tokyo--

Signed and Sealed this

Twenty-seventh Day of August, 1996

Attest:

BRUCE LEHMAN

*Attesting Officer*     *Commissioner of Patents and Trademarks*